US 8,457,652 B2

(12) United States Patent
Liu et al.

(10) Patent No.: US 8,457,652 B2
(45) Date of Patent: Jun. 4, 2013

(54) DEVICE, METHOD, AND SYSTEM FOR RECEIVING CONTENT ON A MOBILE COMPUTING DEVICE

(75) Inventors: Bojin Liu, Davis, CA (US); Behrooz Khorashadi, Mountain View, CA (US); Saumitra M. Das, San Jose, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 121 days.

(21) Appl. No.: 13/030,238

(22) Filed: Feb. 18, 2011

(65) Prior Publication Data

US 2012/0214503 A1 Aug. 23, 2012

(51) Int. Cl.
*H04W 24/00* (2009.01)
(52) U.S. Cl.
USPC .......... 455/456.1; 455/404.2; 455/414.1; 455/457; 455/405; 455/406
(58) Field of Classification Search
USPC .......... 455/404.2, 414.1–414.4, 456.1–456.6, 455/457, 405–406; 705/14.62, 14.4, 14.41, 705/14.49, 14.5
See application file for complete search history.

(56) References Cited

U.S. PATENT DOCUMENTS

| | | | |
|---|---|---|---|
| 8,104,054 B2 * | 1/2012 | Weaver et al. | 725/14 |
| 2008/0242280 A1 * | 10/2008 | Shapiro et al. | 455/414.3 |
| 2010/0145784 A1 * | 6/2010 | Sriver et al. | 705/14.25 |
| 2010/0145804 A1 * | 6/2010 | Ramer et al. | 705/14.52 |

* cited by examiner

*Primary Examiner* — Wayne Cai
(74) *Attorney, Agent, or Firm* — Neugeboren O'Dowd PC

(57) ABSTRACT

A mobile computing device, comprising processing components, memory components, a wireless receiver/transmitter, and an agent stored in the memory components. The agent is adapted to determine a pattern in data received and requested by the mobile computing device, determine a pattern in a location of the mobile computing device, and request to receive data based on (i) the pattern in the data received and requested by the mobile computing device, and (ii) the pattern in the location of the mobile computing device.

12 Claims, 4 Drawing Sheets

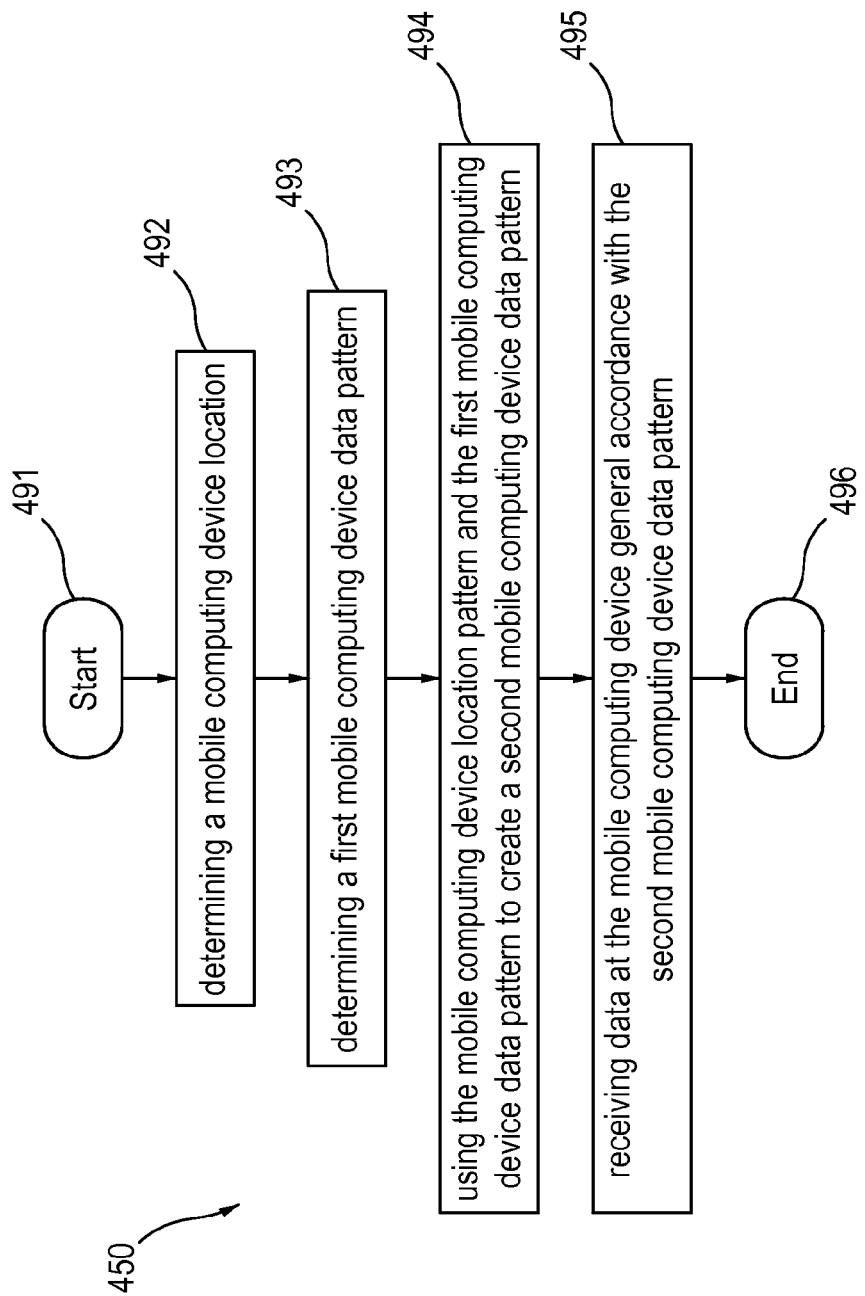

DEVICE, METHOD, AND SYSTEM FOR RECEIVING CONTENT ON A MOBILE COMPUTING DEVICE

FIELD OF THE INVENTION

The present invention relates to mobile computing devices. In particular, but not by way of limitation, the present invention relates to devices, methods and systems for receiving content on a mobile computing device based on a usage pattern.

BACKGROUND OF THE INVENTION

Users of mobile computing devices are increasing the amount of time the device is used to access digital content. For example, mobile computing device users are frequently accessing email, receiving rss feeds, updating blogs, and viewing websites and videos from their mobile devices, as well as providing updates to on-line networking sites such as, but not limited to, Facebook®, Twitter®, and Myspace®. Though a web browser may be used to perform such functions, mobile computing device applications such as, but not limited to, applications for the above listed on-line social networking sites may also be adapted to provide digital content to and from the mobile computing devices.

Although the amount of digital content being accessed from mobile computing devices is increasing, the satisfaction of users accessing such digital content is decreasing. For example, due to increasing mobile network congestion related to the increase in the amount of digital content being accessed across mobile networks, some mobile carriers are putting bandwidth limits and/or data caps on new customers. Thus, users may choose to view lower-quality content comprising less data/bandwidth in order to remain under the data cap/bandwidth limit set by the network carrier. Furthermore, since some high-bandwidth networks are not pervasive throughout a user's network carrier, a mobile computing device application may supply the user with a lower-quality content upon changing from a higher data rate network to a lower data rate network.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

One embodiment of the invention may be characterized as a mobile computing device comprising processing components, memory components, a wireless receiver/transmitter, and an agent stored in the memory components. The agent in one embodiment is adapted to determine a pattern in the data received and requested by the mobile computing device and determine a pattern in the location of the mobile computing device. The agent is further adapted to request to receive data based on the pattern in the data received and requested by the mobile computing device and the pattern in the location of the mobile computing device.

Another embodiment of the invention may be characterized as a non-transitory, tangible computer readable storage medium, encoded with processor readable instructions to perform a method of receiving data at a mobile computing device. The method includes determining a pattern in a location of the mobile computing device. The method further includes receiving one or more requests from one or more applications requesting whether the mobile computing device will enter into one of a lower cost network and a lower bandwidth network. One or more responses are provided to the one or more requests and, based on the one or more responses, the one or more applications are adapted to change the operation of the one or more applications.

Yet another embodiment of the invention may be characterized as a mobile computing apparatus. The mobile computing apparatus comprises a means for determining a mobile computing device data usage pattern and a means for determining a mobile computing device location pattern. The mobile computing apparatus further comprises a means for determining an upcoming change in a mobile computing device network, and a means for informing one or more applications of the upcoming change in the mobile computing device network prior to the change in the mobile computing device network occurring. Furthermore, the mobile computing apparatus comprises a means for the one or more applications to respond to the change in the mobile computing device network prior to the change in the mobile computing device network occurring.

And other embodiment of the invention may be characterized as a method of receiving data at a mobile computing device. One method comprises determining a mobile computing device location pattern, determining a first mobile computing device data pattern, and using the mobile computing device location pattern and the first mobile computing device data pattern to create a second mobile computing device data pattern. The method further comprises receiving data at the mobile computing device in general accordance with the second mobile computing device data pattern.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, where like or similar elements are designated with identical reference numerals throughout the several views and wherein:

FIG. 4 is a flowchart that depicts a method that may be carried out in connection with the embodiments described herein.

DETAILED DESCRIPTION

Figure 1:
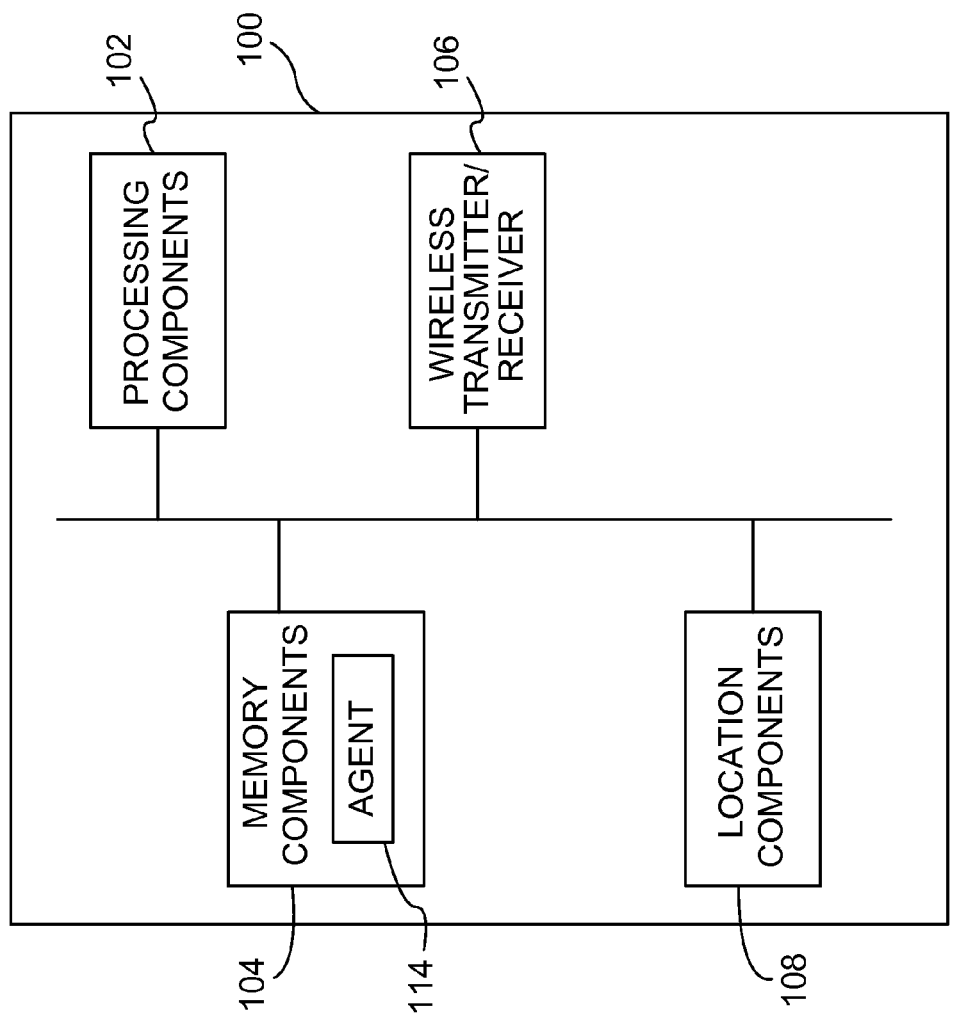
FIG. 1 illustrates a block diagram depicting physical components of an exemplary embodiment of the present invention.

Referring first to FIG. 1, shown is a block diagram depicting physical components of a mobile computing device 100. The mobile computing device 100 may also be referred to as a mobile computing apparatus. The physical components seen in FIG. 1 comprise processing components 102, memory components 104, location components 108 and a wireless receiver/transmitter 106. As seen, stored in the memory components 104 may be an agent 114. The agent 114 may be adapted to monitor requested data sent and received by the mobile computing device 100 to determine a pattern in the data received and requested by the mobile computing device 100. The agent 114 may also be adapted to determine a pattern in the location of the mobile computing device 100. The agent 114 may further be adapted to correlate the location of the mobile computing device 100 to the data received and requested by the mobile computing device 100. In one embodiment, the agent 114 may comprise a plurality of agents.

In one embodiment, the agent 114 may be adapted to use the processing components 102 to store data transmitted to and from the wireless receiver/transmitter 106 in the memory components 104. For example, the agent 114 may inform the processing components 102 to store/record certain information about the data received and requested from the mobile computing device 100 such as, but not limited to, file types, an identifier corresponding to the sender of a received file, a bandwidth used for each file received/sent, and when the file was requested/received/sent by the mobile computing device 100 (i.e. a timestamp). Such information may be recorded in a log file in the memory components 104 for a user-specified or agent-specified time period—such as, but not limited to, a 24-hour time period. The agent 114 may be further adapted to store such information for multiple consecutive or non-consecutive time-periods. In addition to storing information related to the data received/requested by the mobile computing device 100, the agent 114 may also inform the processing components 102 to store in the memory components 104 information related to the location of the mobile computing device 100 and additional information related to the network that the mobile computing device 100 is connected to.

Location information and timestamp information may be obtained from the wireless receiver/transmitter 106. However, location and timestamp information may also be received from the location components 108 such as, but not limited to, a global positioning system (gps) device. However the location information and time information is obtained, the agent 114 may be adapted to use such information to create a pattern of the location of the mobile computing device 100 for any given time period.

Figure 2:
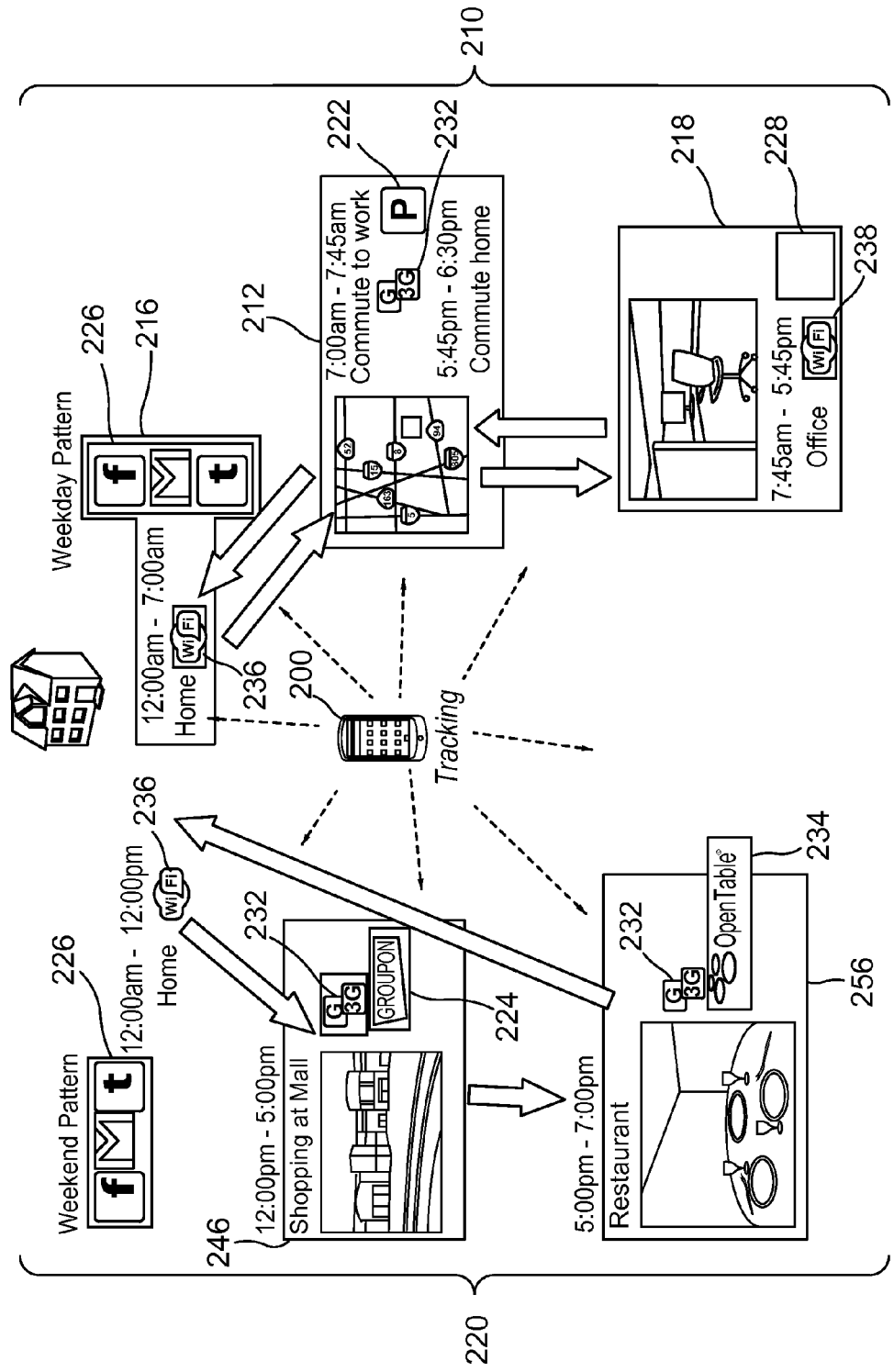
FIG. 2 illustrates a weekend pattern and a weekday pattern of an exemplary embodiment of the present invention.

Seen in FIG. 2 is a weekday pattern 210 of the location of, and the data requested/received by, the mobile computing device 200 as determined by the agent 114 of FIG. 1. Also seen in FIG. 2 is a weekend pattern 220 of the location of, and the data requested/received by, the mobile computing device 200 as determined by the agent 114. As seen, the agent 114 may determine that for a weekday pattern 210, the mobile computing device 200 accesses a home Wi-Fi 236 network from about 12:00 am to 7:00 am at a home 216 location, a 3G network 232 from about 7:00 am to 7:45 am, (which may include a brief occasional interruption in service at about 7:30 am) at a commute 212 location located between the home 216 location and a work 218 location, a work Wi-Fi 238 network from about 7:45 am to 5:45 pm at the work 218 location, and the 3G network 232 again from 5:45 pm to 6:30 pm (which may include a brief occasional interruption in service at about 6:00 pm), before accessing the home Wi-Fi 236 network again from about 6:30 pm to 12:00 am.

The agent 114 may correlate the mobile computing device 200 location, time, and network pattern to a pattern in the data received and requested by the mobile computing device 200. For example, the agent 114 may determine that during the weekday pattern 210, data requested and received by the mobile computing device 200 includes sending and receiving various data types to and from home applications 226 such as, but not limited to, Gmail®, Facebook®, and Twitter® from about 12:00 am to 7:00 am. Similarly, data may be received from commute applications 222 such as, but not limited to, Pandora®, from about 7:00 am to 7:45 am and 5:45 pm to 6:30 pm. Furthermore, work applications 228 such as, but not limited to, an Outlook enterprise application may send data to and from the mobile computing device 200 from about 7:45 am-5:45 pm. The agent 114 may then determine that the home applications 226 are accessed at the home Wi-Fi 236, work applications 228 at the work Wi-Fi 238 and commute applications 222 on the 3G network 232 during the commute 212 between the home 216 location and work 218 location. It is to be appreciated that although the term "application" is used throughout the specification to define a content host, the term "application" may be used interchangeably with "website", where appropriate.

In the weekend pattern 220 seen in FIG. 2, the agent 114 may determine that the home Wi-Fi 236 is accessed from about 12:00 am to 12:00 pm at the home 216 location, and the 3G network 232 is accessed at a mall 246 location from about 12:00 pm to 5:00 pm, and at or near a restaurant 256 location from about 5:00 pm to 7:00 pm. The data requested/received at the home 216 location may comprise the home applications 226, while connected to the home Wi-Fi 236. While connected to the 3G network 232, data may be requested/received between one or more shopping applications/websites 224 such as, but not limited to a Groupon® application/website while shopping at the mall 246 location, and a restaurant reservation/review website 234 such as, but not limited to, an Opentable® application/website on the 3G network 232 while near the restaurant 256 location. The weekday pattern 210 and weekend pattern 220 may be continually updated as the agent 114 tracks (i) the movement of the mobile computing device 200 and (ii) the data accessed and received by the mobile computing device 200. Alternatively, the mobile computing device 200 may request permission from the user to update the location pattern and/or data pattern on-the fly, or once or more daily, weekly, etc. Furthermore, there may be settings to identify applications to add to the patterns For example, an application may only be added to the pattern when it is accessed at a substantially similar time in back-to-back days. Other settings and time frames are contemplated.

Figure 3:
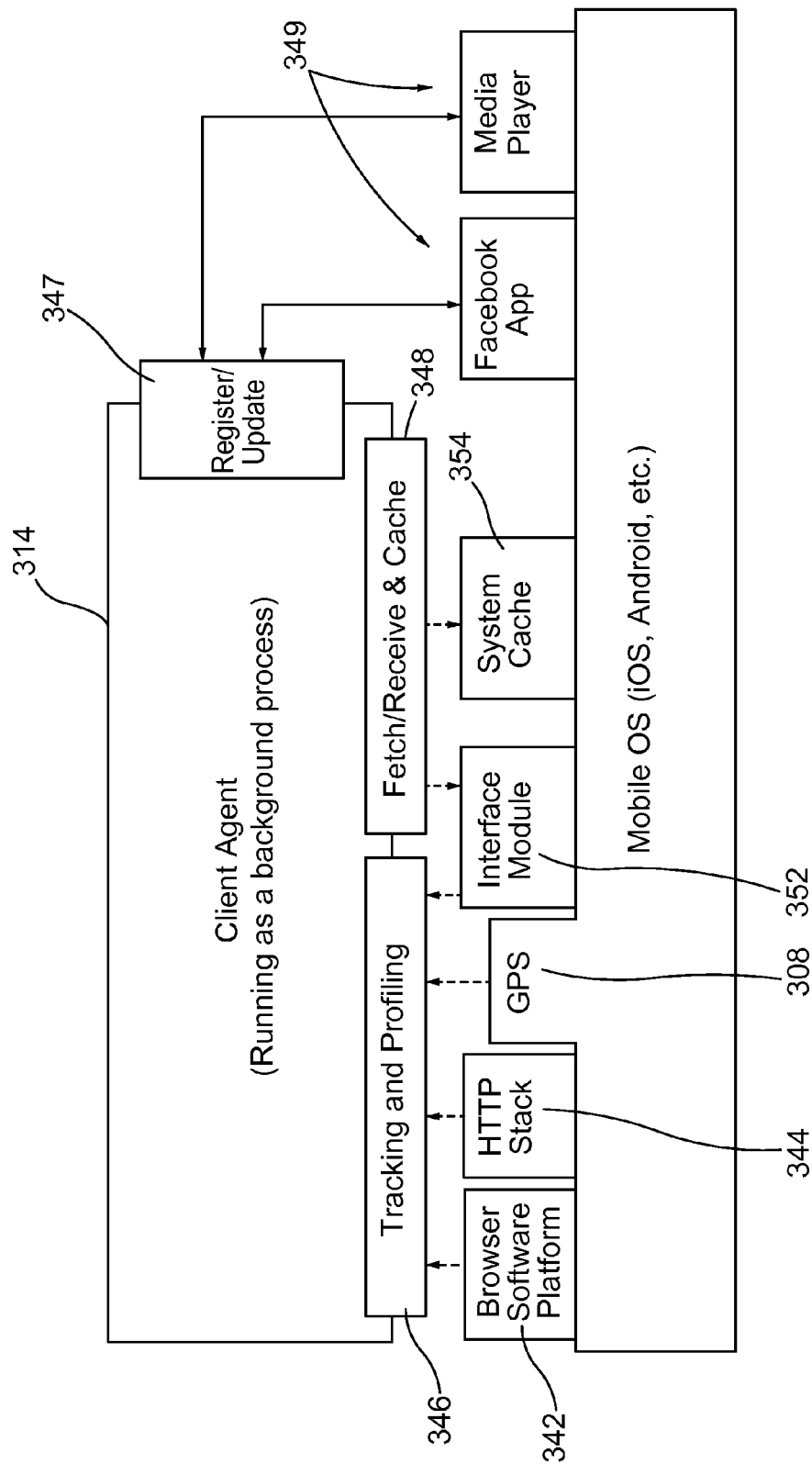
FIG. 3 illustrates a block diagram depicting an agent's communication with features of a mobile OS and applications according to an exemplary embodiment of the invention.

In one embodiment, and as seen in FIG. 3, the agent 314 may operate as a background daemon process that may comprise a first module 346 and a second module 348. Additional modules are contemplated. The first module 346 may comprise a tracking and profiling module and the second module 348 may comprise a fetching/receiving and caching module. In one embodiment, the first module 346 may create and store patterns such as, but not limited to, the weekday pattern 210 and weekend pattern 220, in the memory components 104, while the second module 348 may receive, obtain and store data, based on the patterns. The first module 346 may be referred to as a first interface which may be adapted to communicate with a browser software platform 342, HTTP stack 344, location components 308 such as, but not limited to a gps unit, and an interface module 352 for a mobile computing device operating system. For example, the agent 314 may comprise a mobile computing device software tracking agent adapted to track HTTP stack 344 and browser requests sent through the browser software platform 342 such as, but not limited to, a browser software platform. Such an agent 314 may also be adapted to determine (or receive information related to) the bandwidth available to the mobile computing device 200 at each location of the mobile computing device 200. Various operating systems are contemplated. Monitoring the browser software platform 342 allows for browser-based profiling/patterns, while monitoring the HTTP stack 344 allows for native application profiling/patterns. It is also contemplated to sync the patterns to a device calendar.

One second module 348 may comprise a second interface adapted to communicate with the interface module 352 of the mobile operating system and a system cache 354. The agent 314 may be further comprised of a third module 347 comprising a third interface adapted to communicate with one or more applications 349. The third module 347 may comprise an Application Programming Interface (API) and may be adapted to provide a means for informing mobile computing device applications 349 such as, but not limited to, a Facebook® application and a media player, of a change in the mobile computing device network prior to the change in the mobile computing device network occurring.

Upon obtaining data and location patterns such as, but not limited to, the weekday pattern 210 and weekend pattern 220 seen in FIG. 2, the agent 314 may request to receive (i.e., "fetch") data based on the patterns. Alternatively, or additionally, the agent 314 may also inform the applications 349, through the API, to "pull" data to the mobile computing device 200. For example, in one embodiment, a "streaming" application may be utilized as an application 349. The streaming application may be informed of upcoming likely changes in the network in response to a request for such information, based on the pattern. In one embodiment, one of the commute applications 222 of FIG. 2 may comprise the streaming application 349. The agent 314 may inform the streaming application that service is often interrupted at about 7:30 am and 6:00 pm during the weekday pattern 210. In such a case, the agent 314 may then fetch additional data prior to each of these times so the application may operate properly during the service interruption. Alternatively, the commute application 222 may pull additional data to the mobile computing device 200 prior to these times. In either event, the agent 314 may store the additional data in the system cache 354. In one embodiment, the system cache 354 comprises a portion of the memory components 104. The agent 314 may subsequently retrieve the data from the cache 354, or elsewhere in the memory components 104, prior to the service being interrupted, so that the commute application 222 continues to operate properly during the service interruption. In another example, the application 3494 may comprise the Facebook® application. The Facebook® application may reside on the mobile computing device 100 and data may be pulled from a network server by the application prior to a change to a more expensive network.

The agent 314 may determine whether to pre-fetch data, or to inform applications 349 to pull data, prior to the data being requested from the mobile computing device 200, based upon (i) the network bandwidth available at the time the data will be requested/received, as established by the patterns and (ii) the bandwidth that is used for the data that is sent/received by the mobile computing device 200, as established by the patterns. For example, sticking with the commute 212 portion of the weekday pattern 210 of FIG. 2, the agent 314 may determine that an average bandwidth requirement to properly and/or fully operate or enable the commute applications 222 is about 250 kbps. The agent 314 may also determine that an average bandwidth of the 3G network 232 during the commute 212 is only about 200 kbps. The agent 314 may also be aware that prior to the commute 212, the mobile computing device 200 is connected to either the home Wi-Fi 236 or the work Wi-Fi 238. Furthermore, the agent 314 may determine that the bandwidth of the home Wi-Fi 236 or work Wi-Fi 238 is sufficient to properly operate all work applications 228 or home application 226, and to pre-fetch data to enable the commute applications 222 to operate properly during the commute 212. If the agent 314 determines that the home Wi-Fi 236 or work Wi-Fi 238 does not have sufficient bandwidth to operate home applications 226 or work applications 228, the user may pre-configure the agent 314 to allow the commute applications 222 to have priority over the home applications 226 and/or the work applications 228. Additionally, instead of pre-configuring the agent 314, the agent 314 may be adapted to provide on-the-fly requests to a mobile computing device 100 user to determine which applications have priority over other applications. The agent 314 may also be configured to use a prior-connected network such as the home Wi-Fi 236 and work Wi-Fi 238 to download data to properly run applications such as, but not limited to, the commute applications 222 only when the mobile computing device 200 is connected to the prior-connected network within a specified time period from when the commute applications 222 will be accessed by the mobile computing device 200. For example, the agent 314 may be configured to fetch data when connected to an appropriate network less than one hour prior to the commute applications 222 being accessed. Other time periods and configurations known in the art are also contemplated. In one embodiment, the agent 314 may be configured to fetch data at the home Wi-Fi 236 due to the home Wi-Fi comprising a "free" network that does not charge for downloads, unlike many 3G/4G data plans.

In either case—when the home Wi-Fi 236 or work Wi-Fi 238 bandwidth is sufficient to run all applications at the home 216 or work 218 to fetch or receive pulled data needed to properly run a commute application 222 during the commute 212, and when the commute application 222 has priority over the home applications 226 and/or work applications 228— prior to and/or during the commute 212 the agent 314 may fetch data that the agent 314 determines will be accessed during the commute 212. In one embodiment, the user may also configure the agent 314 to fetch specific types of data for specific applications. In one example, through the API, specific songs/artists/genre of music may be requested for a music application service such as, but not limited to, Pandora®. Instead, or additionally to pre-configuring the agent 314, the user may also receive a notice from the agent 314 requesting which data should be presently fetched for a later application that the agent 314 determines will not have the bandwidth needed to properly run the application. Therefore, when an agent 314 determines that the mobile computing device 200 will likely transfer to a low data rate network from a high data rate network, the agent 314 may determine that data should be fetched prior to this change of network.

In one embodiment, the home Wi-Fi 236 and/or the work Wi-Fi 238 may also comprise networks that do not include a fee for the mobile computing device 200 to access data across the network. For example, these networks may not have a data cap associated with them. However, the commute 3G network 232 may have a data fee, such as, but not limited to, a data cap associated with it. The agent 114 may be aware of these network cost limitations and therefore, may also be able to determine when the mobile computing device 100 is about to move from a less expensive network to a more expensive network. Similar to the description above related to bandwidth, when the mobile computing device 100 is connected to the less expensive network, the agent 114 may download data for use during the more expensive network. It is contemplated that the agent 114 is aware of limits in the network carrier plan supporting the mobile computing device 100 and is aware when accessing the content may charge a mobile computing device account such as, but not limited to, an account the mobile computing device has with a network carrier.

In one embodiment, the agent 114 may determine which data is frequently received by the mobile computing device 100, such as, but not limited to, frequently received data in the home applications 226, commute applications 222 and work applications 228. Defining what constitutes frequently received data may be established by a user adjusting a configuration setting in the agent 114. When the frequently received data is received by the mobile computing device 100, one agent 114 may store, or cache, this data in the memory components 104. For example, the agent 114 may determine that certain content types are frequently accessed through the shopping applications 224 accessed during the weekend pattern 220. In one embodiment, a Groupon® application may provide similar data every time the application is accessed— such as, but not limited to, a .gif file displaying the "Groupon®" trademark. The agent 114 may recognize these frequently received data types and may store such data in the memory components 104. In one embodiment, the agent 114 may store this frequently accessed data in the memory components 104 when the agent 114 determines that the mobile computing device 100 often accesses the data when connected to a low-bandwidth or a high-cost network. Therefore, by storing such frequently-accessed data on the mobile computing device 100, more bandwidth may be available for core application processes on the low-bandwidth network; or, lower charges may be incurred when accessing applications across the high-cost bandwidth.

One embodiment of the invention comprises a non-transitory, tangible computer readable storage medium, encoded with processor readable instructions to perform a method of receiving data at a mobile computing device 200. For example, such an embodiment may comprise the agent 114 described above—adapted to determine one or more patterns in the data received by the mobile computing device 100 and one or more patterns in the location of the mobile computing device 100, such as, but not limited to, the weekday pattern 210 and/or the weekend pattern 220. Furthermore, the agent 114 may comprise the API such as, but not limited to, the third module 347 which may be adapted to receive one or more requests from one or more applications 349 providing data to the mobile computing device 100. It is to be appreciated that the one or more applications 349 may comprise applications 349 locally-stored on the mobile computing device 100 in the memory components 104 or may comprise remote, cloud-based applications/websites.

When such applications 349 are operating and providing data to the mobile computing device 100, the applications 349 may provide one or more requests to receive information comprising whether the mobile computing device 100 is likely to connect to a network comprising one of a higher and lower cost network and a lower and higher bandwidth network. The agent 314 may provide one or more responses to the applications 349, and if, upon receiving at least one of the one or more responses, the one or more applications 349 are informed that the mobile computing device 100 will connect to, for example, a higher cost network and/or a lower bandwidth network, the one or more applications 349 may change the operation of the one or more applications 349. In one embodiment, one of the one or more applications 349 may comprise a video streaming application. The video streaming application may change from a first resolution to a second resolution prior to changing to the one of a higher cost network and/or a lower bandwidth network, with the second resolution being lower than the first resolution. Upon or prior to entering the second network, the mobile computing device 100 may display the lower resolution video. Additionally, second or first resolution video data may be cached prior to changing from the higher bandwidth network to the lower bandwidth network, and displayed upon changing to the second network.

As described, the mobile computing device 100 may comprise a means for determining a pattern in the data requested/received by the mobile computing device 100 and a means for determining a pattern in the location of the mobile computing device 100. For example, the weekday pattern 210 and the weekend pattern 220 described above include both a pattern in the data accessed and received by the mobile computing device 200 and the location of the mobile computing device 200. As stated above, the agent 114 may be able to determine when a change in a mobile computing device network will occur during the mobile computing device location pattern and data usage pattern and can inform one or more applications 349 of the change in the mobile computing device network prior to the change in the mobile computing device network occurring. In response, the application 349 may change the operation of the application to respond to the change in the mobile computing device network prior to the change in the mobile computing device network occurring. In one embodiment, the change in the mobile computing device network comprises a change from a non-bandwidth-limited network to a bandwidth-limited network. Furthermore, in response to the change in the network from a high-bandwidth network to low bandwidth network, one or more applications 349 may request data from one or more remote locations such as, but not limited to, websites, and the mobile computing device 100 may store/cache the data.

Turning now to FIG. 4, seen is a method 450 of receiving data at a mobile computing device. In one embodiment, the mobile computing device comprises the mobile computing device 200 seen in FIG. 2. One method 450 starts at 491 and at 492 comprises determining a first mobile computing device location pattern. For example, the mobile computing device 200 may comprise the agent 114 described above adapted to create a pattern such as, but not limited to, the weekday pattern 210 and the weekend pattern 220. At 493 the method comprises determining a first mobile computing device data pattern. One first mobile computing device data pattern may comprise a pattern in the data requested/received by the mobile computing device 200 where the home applications 226 receive data while connected to the home wifi 236, the commute applications 222 receive data while connected to the 3G network 232, and the work applications 228 receive data when connected to the work wifi 238 with respect to the weekday pattern 210 and/or the weekend pattern 220. At 494 the method comprises using the mobile computing device location pattern and the first mobile computing device data pattern to create a second mobile computing device data pattern. One second mobile computing device data pattern may comprise a data pattern where data determined to be accessed while connected to a network by the first mobile computing device data pattern is retrieved or received prior to entering the network. For example, as seen in FIG. 2, the first data pattern may comprise the mobile computing device 200 accessing the commute applications 222 during the commute 212 times of 7:00 am-7:45 am and 5:45 pm-6:30 pm. The second mobile computing device data pattern may therefore comprise receiving data to run the commute applications 222 prior to the commute 212.

In one embodiment, determining a mobile computing device location pattern and determining a first mobile computing device data pattern 493 may comprise operating the first module 346. Additionally, using the mobile computing device location pattern and the first mobile computing device data pattern 493 to create a second mobile computing device data pattern 495, and receiving data at the mobile computing device 200 in general accordance with the second mobile computing device data pattern 495 may comprise operating the second module 348. One agent 314 may also comprise a plurality of agents 314. This method ends at 496.

In conclusion, embodiments of the present invention enable more efficient use of less-expensive and higher-bandwidth networks by determining when a mobile communicating device is about to enter into a more-expensive or lower-bandwidth network. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A mobile computing device, comprising:
    processing components;
    memory components;
    a wireless receiver/transmitter; and
    an agent stored in the memory components adapted to,
        determine a pattern in data received and requested by the mobile computing device, the pattern in data received and requested by the mobile computing device comprising a first mobile computing device data pattern,
        determine a pattern in a location of the mobile computing device,
        request to receive data based on,
            the pattern in the data received and requested by the mobile computing device, and
            the pattern in the location of the mobile computing device,
        use the pattern in the data received and requested by the mobile computing device and the pattern in the location of the mobile computing device to,
            identify content likely to be accessed by the mobile computing device, and
            download the content likely to be accessed before the content is accessed by the mobile computing device when at least one of,
                the mobile computing device will access the content when connected to a network comprising a network bandwidth that is less than a bandwidth needed to enable the content, and
                the mobile computing device will access the content when connected to a network adapted to charge a mobile computing device account for accessing the content;
            use the pattern in the location of the mobile computing device and the first mobile computing device data pattern to create a second mobile computing device data pattern; and
            request to receive data at the mobile computing device in general accordance with the second mobile computing device data pattern.

2. The mobile computing device of claim 1 wherein,
    the agent comprises a background daemon process;
    determine a pattern in data received and requested by the mobile computing device comprises determining a bandwidth used by the data;
    the pattern in the location of the mobile computing device is determined from a global positioning system device; and
    the request to receive data comprises storing frequently received data in the memory components.

3. The mobile computing device of claim 1 wherein, determine a pattern in a location of the mobile computing device comprises,
    determining when the mobile computing device will transfer from one of a low data rate network and a high data rate network to the other of the low data rate network and the high data rate network; and
    determining when a user will move from one of a less expensive network and a more expensive network to the other of the less expensive network and the more expensive network.

4. The mobile computing device of claim 1 wherein, the agent comprises,
    at least one first interface adapted to communicate with,
        a browser software platform,
        an HTTP stack,
        a gps unit, and
        a mobile computing device operating system;
    at least one second interface adapted to communicate with,
        the mobile computing device operating system, and
        a system cache; and
    at least one third interface adapted to communicate with one or more applications.

5. The mobile computing device of claim 1 wherein, the agent is further adapted to,
    provide video at a first resolution; and
    cache the video at the first resolution prior to entering the one of the higher cost network and lower bandwidth network.

6. The mobile computing device of claim 5 wherein, the agent is further adapted to display the cached video data upon entering the one of the higher cost network and the lower bandwidth network.

7. The mobile computing device of claim 6 wherein, the higher cost network comprises a network comprising a data usage cap.

8. The mobile computing device of claim 1 wherein the agent is further adapted to determine an upcoming change in a mobile computing device network.

9. The mobile computing device of claim 1 wherein, the network bandwidth comprises a first network bandwidth for use by the first mobile computing device during the first mobile computing device data pattern.

10. The mobile computing device of claim 9, further comprising a second network bandwidth, the second network bandwidth adapted for use by the first mobile computing device to receive data in general accordance with the second mobile computing data pattern.

11. The mobile computing device of claim 10 wherein, the first network bandwidth and the second network bandwidth are substantially similar.

12. The mobile computing device of claim 10 wherein, the first network bandwidth and the second network bandwidth are different.

* * * * *